Figure 1:
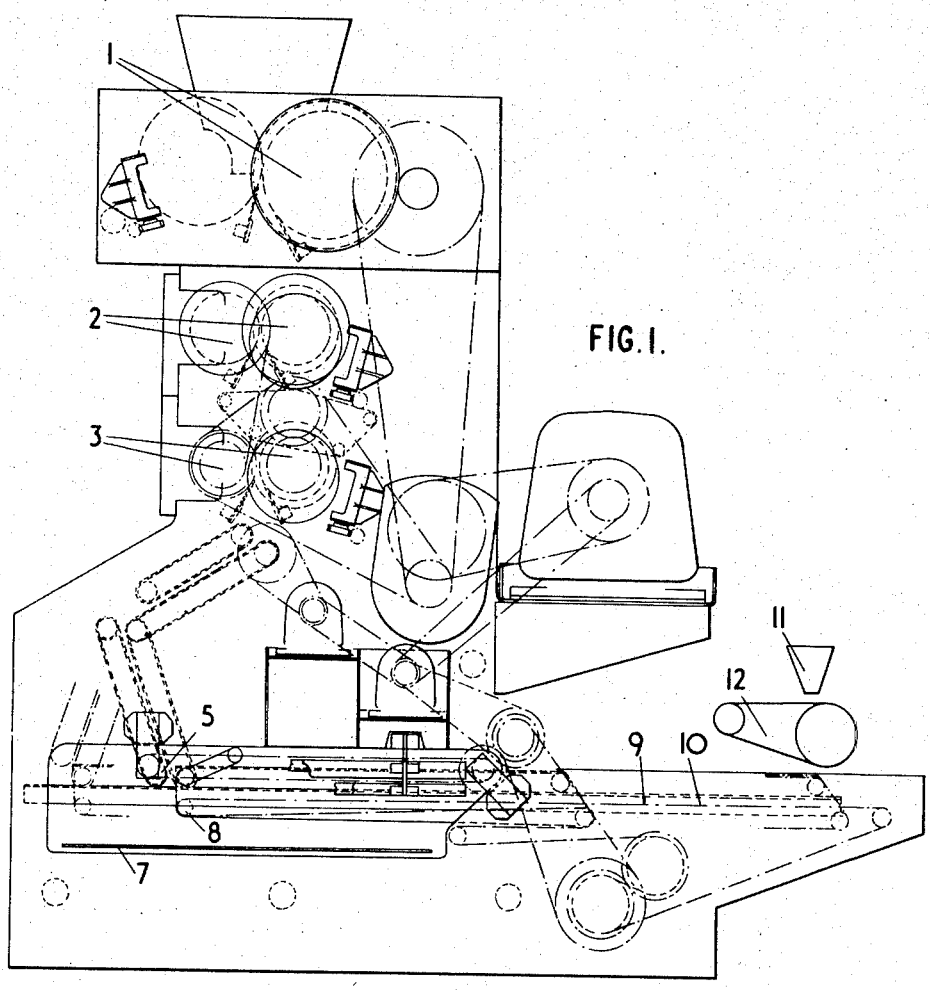
Figure 2:
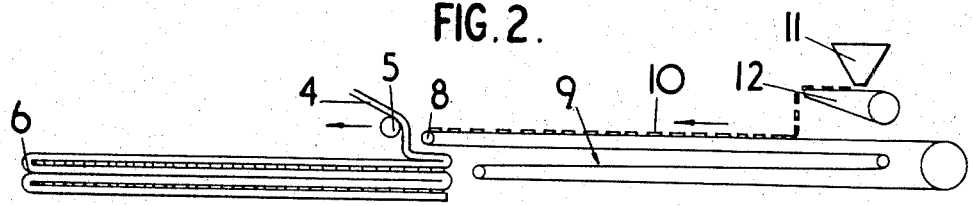
Figure 3:
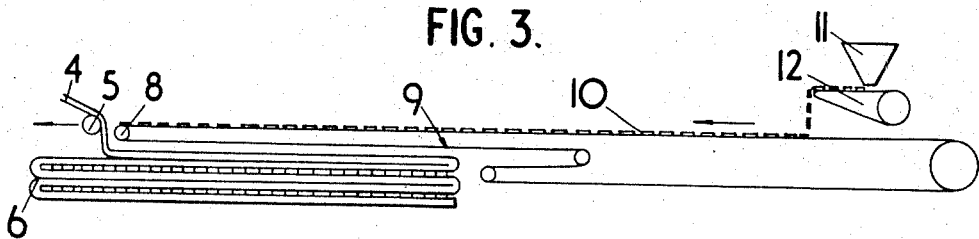
Figure 4:
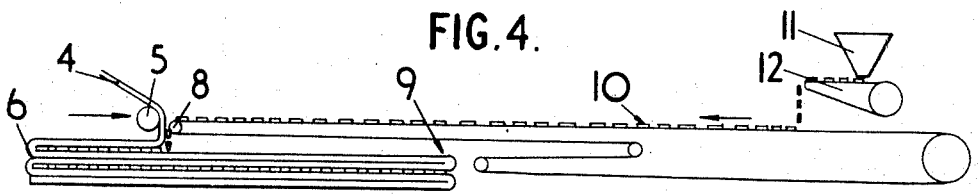
Figure 5:
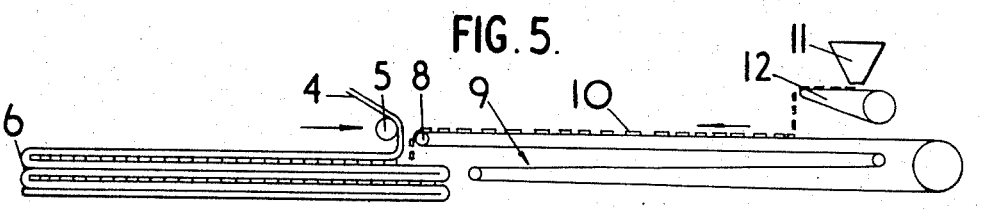

United States Patent

Steels

[15] 3,698,309
[45] Oct. 17, 1972

[54] DOUGH LAMINATING

[72] Inventor: Gordon Steels, Peterborough, England

[73] Assignee: Baker Perkins Limited, Peterborough, England

[22] Filed: Nov. 20, 1970

[21] Appl. No.: 91,382

[52] U.S. Cl. ............... 99/450.1, 425/104, 425/115, 425/310, 118/18, 99/90
[51] Int. Cl. ................................................. A21c
[58] Field of Search ........................ 107/1 R, 1 J, 54

[56] References Cited

UNITED STATES PATENTS

| | | | |
|---|---|---|---|
| 2,478,075 | 8/1949 | Baker | 107/1 J |
| 3,354,842 | 11/1967 | Manspeaker | 107/1 J |

OTHER PUBLICATIONS

Production of Puff Paste, The Bakers Digest, by Heinz Frobeen, February 1957, pp. 58–61 and 79

Primary Examiner—Patrick D. Lawson
Attorney—Larson, Taylor & Hinds

[57] ABSTRACT

In a method and apparatus for laminating bakery dough in the manufacture of crackers for example a continuously moving peeler conveyor band is caused to reciprocate with a reciprocatory laminating device for the purpose of depositing an additive such as fat/flour dust between the dough laminations the speed of the conveyor band relative to the speed of the laminating device being such that the additive is discharged from the conveyor during movement of the laminating device in one direction only.

7 Claims, 6 Drawing Figures

PATENTED OCT 17 1972

3,698,309

SHEET 1 OF 3

INVENTOR

GORDON STEELS

DOUGH LAMINATING

This invention relates to a method of laminating bakery product sheets such as pastry or dough sheets for use in making biscuits, cream and soda crackers and the like, and to apparatus useful for carrying out the method.

In the manufacture of hard sweet biscuits, soda crackers and water biscuits, a single sheet of dough is produced by a 2 or 3 roll sheeter followed by two pairs of gauge rolls which then deliver the sheet to a sheet layering or laminating device.

For cream crackers two sheets of dough are produced from a pair of 2 or 3 roll sheeters with means for adding a layer of fat/flour dust between the sheets which are then passed between three sets of gauge rolls and united into a single sheet with the fat/flour dust in the center before arrival at the layering or lamination device.

If a laminating device operating on a single sheet of dough received from a 2 or 3 roll sheeter is provided with means for adding the fat/flour dust at the point of layering or laminating the dough, (which point moves back and forth with a fixed stroke during lamination) it is possible to produce a design of apparatus which will be universal in its application in so far as the apparatus can be used for producing from a single sheet of dough both laminated dough, without fat/flour dust being added, (for soda crackers and water biscuits), or for producing laminated dough with the addition of fat/flour dust for cream crackers, from a single sheet of dough.

The present invention consists in a method of laminating a bakery product sheet such as a sheet of cracker dough using a reciprocatory laminating device wherein an additive such as fat/flour dust is continuously introduced between a pair of laminations at the point of lamination as this point moves in one direction, the additive being received from a continuously moving band conveyor, a nosepiece of which reciprocates back and forth with the laminating device, and onto which conveyor the additive has been deposited.

The invention further consists in apparatus for laminating a bakery product sheet such as a sheet of cracker dough comprising a reciprocatory laminating device and a continuously movable band conveyor having a nosepiece adapted to reciprocate with the laminating device during continuous movement of the conveyor band whereby material deposited onto the conveyor band can be continuously delivered at the point of lamination during the formation of a pair of sheet laminations and while the conveyor nosepiece moves in one direction.

If vertical sheeting means is used to deliver a dough sheet to a reciprocatory laminating carriage, and the fat/flour dust from a conventional type of spreader is deposited onto a continuously moving band, the nosepiece of which is attached to the reciprocating laminator carriage, it is possible to add the fat/flour dust at the point of lamination where the vertical dough sheet changes to a horizontal plane.

Figure 6:
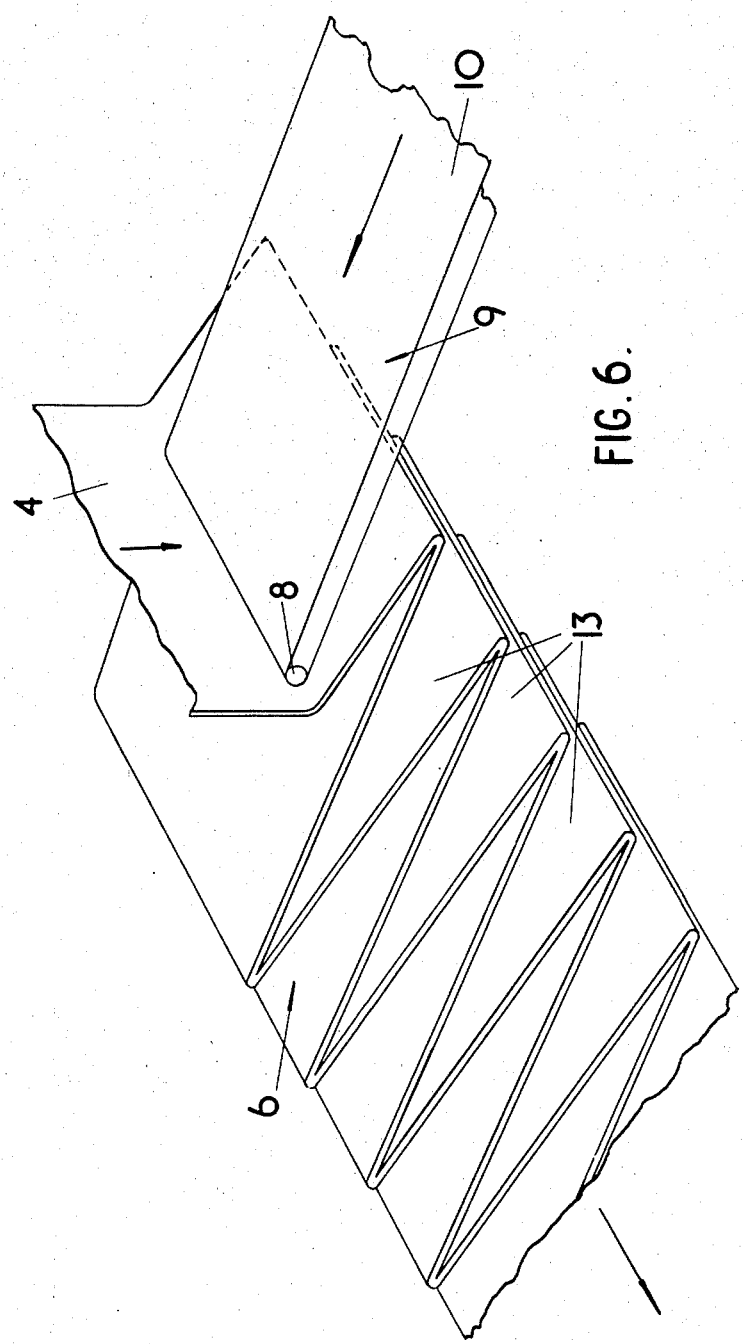

The invention will now be described by way of example with reference to the accompanying drawings in which:

FIG. 1 is a semi-diagrammatic side view of apparatus according to the invention, FIGS. 2 to 5 are diagrammatic side views of the apparatus during different stages in its operation in the formation of a single lamination, and FIG. 6 is a diagrammatic perspective view of the apparatus showing the resultant product.

Referring to FIG. 1, a vertical 2-roll dough sheeter, with a pair of sheeting rolls 1 having co-operative sets of gauging rolls 2 and 3 supplies a dough sheet 4 to a horizontally reciprocating laminating carriage 5 which produces a laminated sheet 6 on a laterally moving surface 7 of a cutting machine. Attached to the laminating carriage at its forward end where the laminating action is effected, is the nosepiece 8 of a peeling conveyor 9 having a continuously movable conveyor band 10 which in use receives fat/flour dust from a hopper 11 via a fixed distributor conveyor 12. By suitable adjustment of the speed of the band 10 compared with the speed of movement of the laminating carriage the peeling conveyor will with this arrangement continuously lay the dust onto the laminated sheet at the point of lamination only during retracting strokes of the peeling conveyor.

Thus, assuming that the width of the laminated dough sheet on the cutting machinery is 1 meter wide, then the delivery end of the laminating carriage will traverse this width at a constant velocity and travel a total distance of 2 meters during one carriage cycle.

The continuous fat/flour distributing band 10 is the same width as the laminated sheet, and is driven at a constant velocity and moves through 2 meters during one carriage cycle.

When the terminal roller of the distributing band is moving away from the fixed fat/flour spreader (FIGS. 2 and 3) through a total distance of 1 meter, the driving drum of the distributing band will move 1 meter of band past the fat/flour distributor 12. As the terminal roller is moving through a distance of 1 meter away from the driving drum at the same time the band is moving towards this terminal roller through a distance of 1 meter, then the resultant movement over the nose roller will be zero, and therefore no fat/flour will be delivered onto the sheet of dough beneath the carriage.

On the return stroke (FIGS. 4 and 5) the carriage will move back through 1 meter with the band still moving forward 1 meter during this time, and therefore the resultant movement over the nose roller will be 2 meters and result in 2 meters of fat/flour being delivered onto the 1 meter length of dough underneath.

In other words, fat/flour is metered continuously onto the moving band 10 and is stored on this band during the forward travel of the laminator and discharged from the band during the return stroke.

This means that a layer of fat/flour is being sandwiched between double thicknesses of dough sheet as shown in FIGS. 2 to 6.

An alternative arrangement to this is to fit an additional identical peeling conveyor unit on the opposite side of the reciprocating laminating carriage, so that when one unit is advancing and not delivering fat/flour, the other is retracting and delivering fat/flour. With this arrangement there will be a layer of fat/flour between each single sheet of dough.

One problem with the above method of layering is that if the fat/flour is distributed to the full width of the sheet to be laminated, there will be exposed fat/flour dust in a wedge-shaped piece 13 (FIG. 6) for each lamination which is not desirable. By cutting down the width of the fat/flour by a dimension equal to one laminating pitch this problem is overcome, but presents another one in that the sandwiching is not uniform throughout the whole length of the laminated sheet. This arrangement may still produce an acceptable cream cracker, but an arrangement to overcome this possible problem is to fit a moving diverter chute beneath the fat/flour spreader, so that the fat/flour is tapered onto the distributing conveyor, the diverted fat/flour being collected and returned to the hopper 11. Again with this arrangement a further problem is presented in that the amount of fat/flour will vary from side to side and this is again overcome by using the double arrangement, i.e., fat/flour spreader on each side of the machine.

I claim:

1. A method of laminating a bakery product sheet such as a sheet of cracker dough using a reciprocatory laminating device wherein an additive such as fat/flour dust is continuously introduced between a pair of laminations at the point of lamination as this point moves in one direction, the additive being received from a continuously moving band conveyor, a nosepiece of which reciprocates back and forth with the laminating device, and onto which conveyor the additive has been deposited.

2. A method as claimed in claim 1 wherein the band speed of the conveyor relative to the speed of the laminating device is such that the additive is introduced between the laminations only during travel of the laminating device in one direction.

3. Apparatus for laminating a bakery product sheet such as a sheet of cracker dough comprising a reciprocatory laminating device and a continuously movable band conveyor having a nosepiece adapted to reciprocate with the laminating device during continuous movement of the conveyor band whereby material deposited onto the conveyor band can be continuously delivered at the point of lamination during the formation of a pair of sheet laminations and while the conveyor nosepiece moves in one direction.

4. Apparatus as claimed in claim 3 wherein the conveyor is a peeling conveyor.

5. Apparatus as claimed in claim 3 wherein the conveyor band is adapated to travel at a speed relative to the speed of travel of the laminating device such that material is only delivered from the conveyor during travel of the laminating device in one direction.

6. Apparatus as claimed in claim 3 including a hopper and a fixed distributor conveyor for depositing material onto the band conveyor.

7. Apparatus as claimed claim 3 including a vertical sheeter adapted to supply sheet material to the laminating device.

* * * * *